United States Patent [19]
Kimbara et al.

[11] 3,814,068
[45] June 4, 1974

[54] COMBUSTION CHAMBER FOR AN INTERNAL COMBUSTION ENGINE OF DIRECT INJECTION TYPE

[75] Inventors: Motoyasu Kimbara, Yokohama City; Yoshitaka Yoshida, Tokyo, both of Japan

[73] Assignee: Isuzu Motors Limited, Tokyo, Japan

[22] Filed: Apr. 12, 1972

[21] Appl. No.: 243,197

[30] Foreign Application Priority Data
April 15, 1971 Japan.................. 46-23766

[52] U.S. Cl............................................. 123/32 A
[51] Int. Cl. ........................................... F02b 3/00
[58] Field of Search ............ 123/32 ST, 32 R, 32 A

[56] References Cited
UNITED STATES PATENTS

| | | | |
|---|---|---|---|
| 2,975,773 | 3/1961 | Meurer | 123/32 |
| 3,083,700 | 4/1963 | Madak et al. | 123/32 |
| 3,125,079 | 3/1964 | Hoffman | 123/32 |
| 3,144,008 | 8/1964 | List | 123/32 |
| 3,302,627 | 2/1967 | Morris | 123/32 |

Primary Examiner—Laurence M. Goodridge
Assistant Examiner—Ronald B. Cox
Attorney, Agent, or Firm—Toren and McGeady

[57] ABSTRACT

Direct injection type internal combustion engine including combustion chambers each formed by a cylinder head, a cylinder liner and a piston head, the piston head having a cavity wherein the air swirl is produced by known means, and fuel injection nozzles each disposed substantially in the center of the each cavity and having a plurality of orifices adapted to direct jets of fuel radially against the cavity wall, said cavity being so constructed that the cavity wall of a generally circular contour is locally extended toward the center of the cavity to form the same number of side portions as the nozzle orifices, consisting of straight lines or nearly straight curves, said side portions being equidistantly spaced apart and interconnected with arcuate curves thereby to form a multilobed or multilateral cavity, and the nozzle orifices are turned and displaced to enable the jets of fuel therefrom to impinge obliquely against said side portions of the cavity wall and be deflected thereby.

5 Claims, 5 Drawing Figures

COMBUSTION CHAMBER FOR AN INTERNAL COMBUSTION ENGINE OF DIRECT INJECTION TYPE

This invention relates to a combustion chamber for an internal-combustion engine of direct injection type. MOre particularly, the invention concerns a combustion chamber having a multilateral cavity structure capable of controlling the factors which have important bearings upon the performance of the engine of this type, namely, the intensity of air swirl, distribution of fuel, and mixing of the fuel with air by diffusion or evaporation.

In generally the combustion chambers for the direct injection type internal-combustion engine are each formed by a cylinder head, a cylinder liner and a piston head.

Figure 1:
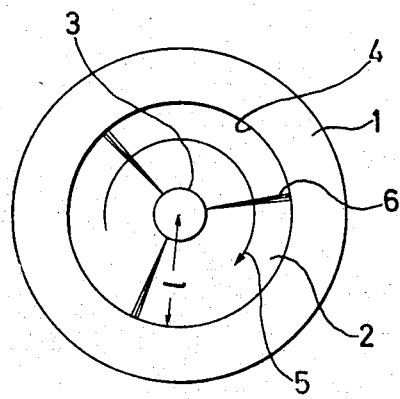
Figure 1:
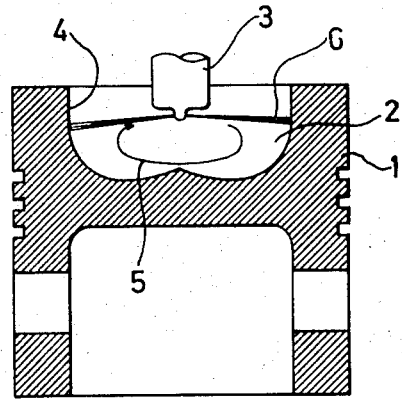

In a combustion chamber of a conventional direct-injection engine having a cavity 2 of which the contour of the cavity wall 4 is circular shaped in the top portion of each piston 1 as shown in FIGS. 1(I) and 1(II), fuel is injected from a multi-orifice nozzle 3 (shown with three orifices in this case) disposed substantially in the center of the cavity 2, against the cavity wall 4. The combustion chamber is provided with various means, e.g.; shroud valves, directional ports, or helical ports, to produce an air swirl (in the direction indicated by an arrow 5). Part of the fuel 6 which was injected radially to the inner wall of the cavity from the nozzle 3 impinges upon the air swirl 5 which is already present in the cavity 2, and is directly dispersed and mixed in the suction air (the phenomenon being hereinafter called "primary spread" of fuel). The rest of the fuel penetrates through the swirl 5 and reaches the cavity wall 4, where some of the fuel is spread (the phenomenon being called "secondary spread" of fuel) while the remaining fuel wets the surface of the cavity wall in the form of a thin film of fuel.

The combustion of the fuel takes place in the following way. First, the mixture formed by the primary spread of the fuel is burnt by self ignition. Next, the mixture obtained by the secondary spread is ignited. Lastly, the fuel wetting the cavity wall 4 is vaporized by the heat generatd by the preceding ignitions and the heat of the cavity wall 4 (the phenomenon being hereinafter called "vaporization" of fuel), and the resulting vapor mixes in the swirl 5 and burns in the cavity 2. In this process of ignition and combustion the hot gas (not containing oxygen) that has been burnt in the initial stage becomes smaller in specific gravity than unburnt air (containing much oxygen) and tends to gather in the center of the cavity 2 under the centrifugal action of the swirl 5.0 The unburnt air having greater specific gravity begins to whirl, instead of the hot gas, along the cavity wall 4. In this way the fuel vapor formed in the vicinity of the cavity wall surface by the secondary spread and vaporization of the fuel is efficiently mixed up with said unburnt air to burn along the cavity wall 4. THus, theoretically, an excellent-performance engine with a very quiet and desirable combustion process is obtained by controlling the intensity of swirl 5, the angle of impingement of the fuel against the cavity wall 4, and the temperature of the cavity wall surface and maintaining the primary and secondary spreads and vaporization of the fuel in good balance.

Actually, however, it is difficult with a combustion chamber having a circular cavity 2 as shown in FIGS. 1(I) and 1(II) to have the afore-described process of combustion gone through perfectly over an extensive range of engine speed. The reason is that, as is well known in the prior art, the whirling velocity of suction air increases in proportion to the engine speed, and therefore it is a general tendency that the intensity of the swirl 5 is not sufficient in the low-speed region of the engine and rather excessive in the high-speed region. In the case where the intensity of the air swirl is too weak, it would make the primary spread and vaporization of the fuel insufficient, which in turn would result in a lean fuel-air mixture, a low combustion rate, a reduced engine output, and smoky emissions.

If the intensity of the air swirl 5 is too strong, the amount of primary spread as well as vaporization of the fuel increases due to insufficient penetration of the fuel through the swirl 5. It leads to very rapid combustion and a high combustion noise. The stresses that are applied on the engine components increase accordingly, and rises of localized combustion temperatures deteriorate the mechanical parts. Moreover, formation of noxious ingredients in exhaust gases is promoted.

In an engine having a multi-orifice nozzle 3 in the nearly center of each circular cavity 2 as shown in FIGS. 1(I) and 1(II), the distance $l$ between the nozzle 3 and the cavity wall 4 is nearly constant because the contour of the cavity 2 is in the form of a circular shape. This means that the impingement angle of the fuel with the cavity wall 4 and the wetted area of the cavity wall surface can be a little adjusted. Even if the nozzle 3 is turned and displaced to alter the orifice directions, the fuel injected from the orifices simply impinges upon the cavity wall 4 nearly at right angles thereto and wets the same. Much less, it is impossible to adjust the impinging and wetting position of the injected fuel against the cavity wall 4 in such a manner as to obtain the best impingement angle and wetting area in view of the available swirl intensity (engine speed). Consequently, the engine attains an increased speed and induces a strong swirl. The percentage of the primary spread of the fuel rises, and the fuel distribution in the cavity 2 becomes uneven. Thus the actual process of combustion tends to deviate from the course that the theory tells.

It is therefore an object of our invention to provide, in view of the various disadvantages of the conventional combustion chamber having a circular cavity as above noted, a combustion chamber having a non-circular, multilobed or multilateral cavity which is capable of realizing a theoretical combustion process.

We also aim at providing a combustion chamber capable of effecting desirable combustion process by avoiding only the tendency toward an excessive swirl in the high engine speed region while adequately maintaining the swirl intensity in the low-speed region, on the basis of the known theory that the damping effect of air swirl increases in proportion to the square of the swirl velocity (or the square of the engine speed).

A further object of the invention is to provide a combustion chamber for which the angle of impingement of the fuel against the cavity wall and the wetted area thereon can be adjusted to attain improved mixing of the fuel and air.

These and other objects, advantages, and features of this invention will become apparent from the following description taken in conjunction with the accompanying drawing. It should be obvious for those skilled in the art that the present invention is not limited to the embodiment to be described hereunder but many other alterations and modifications are possible without departing from the spirit and scope of the invention as defined in the claim.

Figure 2:
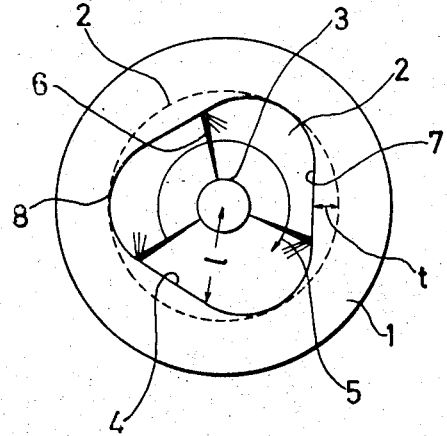
Figure 2:
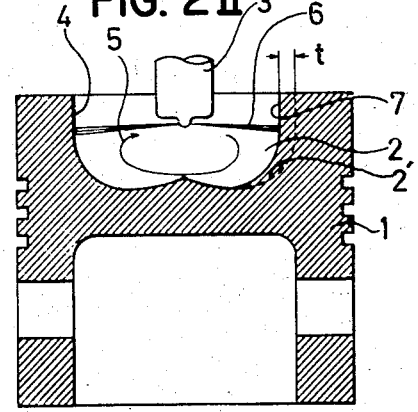
Figure 3:
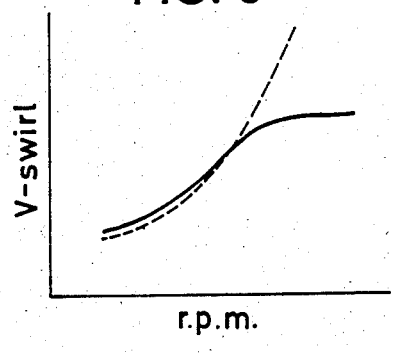

In the drawing:

FIGS. 1(I) and 1(II) are a plan view and a vertical sectional view, respectively, of a piston formed with a combustion chamber in the conventional manner;

FIGS. 2(I) and 2(II) are a plan view and a vertical sectional view, respectively, of a piston with a combustion chamber shaped in accordance with the invention; and FIG. 3 is a graph showing the relations between swirl velocity and engine speed of the combustion chambers of the invention and of the conventional design.

Our invention will now be described in connection with an embodiment shown, with a substantially triangular-shaped cavity. Like the ordinary combustion chamber illustrated in FIGS. 1(I) and 1(II), the combustion chamber of the invention shown in FIGS. 2(I) and 2(II) is formed by a cylinder head, a cylinder liner and a piston head with cavity 2. A fuel injection nozzle 3 is located substantially in the nearly center of the cavity 2. The nozzle 3 is formed with a plurality of orifices (in this case three orifices) in such a way that fuel can be injected radially against the inner wall surface of the cavity wall 4. By means known in the prior art, an air swirl 5 is created inside the cavity 2.

The contour of the cavity wall 4 is approximately triangularshaped. As compared with the contour of the conventional circular cavity 2' indicated by broken lines in FIGS. 2(I) and 2(II), the surrounding wall 4 of the cavity 2 according to this invention extends inwardly or toward the cavity center in three equidistantly spaced portions of the circle, by a suitable thickness $t$ each, to form three straight or nearly-straight curved sides walls 7 (extended portions) of a triangle. The three sides walls 7 are connected to each other with three arcuate curves 8 as if forming three lobes. The nozzle 3 is located in such a manner that the jets of fuel from its three orifices impinge obliquely against the three sides walls 7 of the cavity wall 4 to be rebounded therefrom.

By the cavity 2 having a multilateral contour with three side walls 7 as above described, the combustion process of the engine is made ideal. To be more specific, the intensity of the swirl 5 is set by swirl-inducing means of known type to a value optimum for the low-speed region of the engine, and the primary and secondary spreads and vaporization of the fuel are effected in the region in conformity with the established theory. When the engine speed has risen to the high speed region, the swirl 5 which otherwise tends to be excessive with the increase of the engine speed is positively reduced by the extended side portions 7. Naturally the primary and secondary spreads and vaporization are kept on in a well balanced way, and the theoretical combustion process is continued. Stated differently, the combustion chamber according to the invention in which an adequate swirl intensity is set for the low-speed region, can have the swirl 5 of an intensity exactly as preset in that speed region without any influence whatsoever of the side portions 7. It is not until the swirl 5 gains momentum with the elevation of the engine speed that the side portions 7 of the cavity 2 begin to have an exquisite effect. The stronger (that is, the faster) the swirl 5, the closer the swirl is centrifugally driven toward the cavity wall 4 in order to run fast along the wall surface. Then, the inwardly extended side portions 7 produce a sufficiently strong friction between themselves and the swirl 5 to dampen and keep the swirl from overgrowing. This dampening effect on the swirl 5 increases in proportion to the square of the swirl velocity, and hence the stronger the swirl 5, the greater the dampening effect that is attained. Thus, in a combustion chamber having an ordinary circular cavity without the inwardly extended side portions 7 of the invention, the swirl velocity is directly proportional to the engine speed, as represented by a broken-line curve in FIG. 3. According to our invention, by contrast, the swirl velocity in the high-speed region can be suitably dampened and controlled (as represented by the solid-line curve in the same graph) while the swirl in the low-speed region is maintained at an adequate velocity. In this way the above-mentioned problems ascribable to the swirl 5 of a too high intensity are all settled, and a satisfactory combustion process is allowed to take place with ideal primary and secondary spreads and vaporization of fuel over an extensive engine speed range.

Also, in the combustion chamber according to this invention the orifices of the nozzle 3 are so directed that the jets of fuel therefrom impinge obliquely against the corresponding side portions 7 and are deflected thereby. This remarkably improves the formation of a mixture particularly with the deflection and secondary spread of the fuel. The improved fuel distribution heightens the air utilization rate and leads to an increased output and a reduction of smoky emissions. Since the distance $l$ between the nozzle 3 and the cavity wall 4 is continuously varied, it is possible to choose a desirable angle of impingement of the fuel jets from the multi-orifice nozzle 3 against the side portions 7 and the surface area of the cavity wall 4 to be wetted by the fuel by simply adjusting the orifice directions relative to the side portions 7 so as to attain optimum secondary spread and vaporization of the fuel. This has never been feasible with the ordinary combustion chambers having circular cavities.

It is important that the side portions 7 should be formed of straight lines or substantially straight curves because they extend inwardly as compared with the surrounding wall of a circular cavity and thereby prevent over-intensifying of the swirl and effectively deflect the fuel jets from the nozzle 3 to adjust the secondary spread of the fuel. Although a generally triangularshaped cavity has been described herein, square-, pentagon-, or hexagon-shaped cavity can achieve exactly the same advantageous effects.

What is claimed is:

1. In an internal combustion engine of the direct injection type including combustion chambers each formed by a cylinder head, a cylinder liner, a piston head having a wall defining a generally cylindrical cavity, means for producing air swirl in said cavity and fuel injection means each having a plurality of fuel injection nozzles, the improvement comprising, in combination, means mounting said fuel injection means substantially at the center of said cavity with said nozzles being arranged to inject jets of fuel into said cavity radially against said cavity wall, said cavity wall being structured with portions thereof extending inwardly toward the center of said cavity to form said cavity with a plurality of generally straight side portions, said side portions being equidistantly spaced apart circumferentially about said cavity with arcuate curved portions of said wall extending between said side portions, the number of said side portions provided being equal to the number of nozzles in said fuel injection means, said fuel injection means being disposed relative to said cavity wall for displacement thereof to enable said jets of fuel to impinge obliquely against said side portions.

2. An engine according to claim 1 wherein three of said side portions are provided to form said cavity in a generally triangular shape.

3. An engine according to claim 1 wherein four of said side portions are provided to form said cavity in a generally square shape.

4. An engine according to claim 1 wherein five of sid side portions are provided to form said cavity in a generally pentagonal shape.

5. An engine according to claim 1 wherein six of said side portions are provided to form said cavity in a generally hexagonal shape.

* * * * *